United States Patent [19]

Maruyama et al.

[11] 3,933,492

[45] Jan. 20, 1976

[54] NOVEL PHOTOCONDUCTIVE SUBSTANCES AND THEIR APPLICATION

[75] Inventors: Shoji Maruyama, Sagamibara; Takamichi Enomoto, Sendai, both of Japan

[73] Assignee: Kabushiki Kaisha Ricoh, Tokyo, Japan

[22] Filed: July 5, 1973

[21] Appl. No.: 376,747

Related U.S. Application Data

[63] Continuation-in-part of Ser. No. 335,744, Feb. 26, 1973, abandoned.

[30] Foreign Application Priority Data

| Feb. 23, 1972 | Japan | 47-19260 |
| Feb. 20, 1973 | Germany | 2308332 |
| Feb. 23, 1973 | United Kingdom | 8916/73 |
| Feb. 22, 1973 | Canada | 164355 |

[52] U.S. Cl. .................................... 96/1.5
[51] Int. Cl.$^2$ ................................. G03G 5/04
[58] Field of Search .................. 96/1 R, 1.5, 1.6

[56] References Cited
UNITED STATES PATENTS

| 3,037,861 | 6/1962 | Hoegl | 96/1.5 |
| 3,307,940 | 3/1967 | Hoegl | 96/1.5 |
| 3,418,116 | 12/1968 | Inami | 96/1.5 |

*Primary Examiner*—David Klein
*Assistant Examiner*—John L. Goodrow

[57] ABSTRACT

Derivatives of polyglutamic acid with a molecular weight of from 1,000 to 100,000 and having the following general formula (I) are novel photoconductive substances which are superior in film forming ability and are suitable for use as photoconductors for electrophotographic copying materials:

General formula (I)

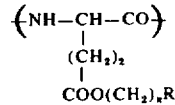

wherein
R represents a polynuclear aromatic or a heterocyclic nitrogen group, each containing up to sixteen carbon atoms, and
$n$ is the integer 1 or 2.

10 Claims, No Drawings

NOVEL PHOTOCONDUCTIVE SUBSTANCES AND THEIR APPLICATION

RELATED APPLICATION

This application is a continuation-in-part application of our copending application Ser. No. 335,744 filed Feb. 26, 1973.

BACKGROUND OF THE INVENTION

1. Field of the Invention

The present invention relates to photoconductive substances and to electrophotographic copying materials which are produced employing said substances.

2. Description of the Prior Art

Various photoconductive substances for use in the preparation of electrophotographic copying materials, including such polymers as polyvinyl carbazole, etc. are already known. While these substances have satisfactory electrophotographic properties, they are defective in film forming ability.

SUMMARY OF THE INVENTION

The present invention comprises photoconductive substances which are novel derivatives of polyglutamic acid, manifest satisfactory electrophotographic properties and are superior in film forming ability, together with electrophotographic copying materials prepared from said substances.

The photoconductive substances of the present invention have a molecular weight of from 1,000 to 100,000, and may be represented by the following general formula (I):

General formula (I)

$$\mathrm{\{NH-CH-CO\}}$$
$$\mathrm{(CH_2)_2}$$
$$\mathrm{COO(CH_2)_nR}$$

wherein
R represents polynuclear aromatic, or heterocyclic nitrogen groups each containing up to about sixteen carbon atoms, and
n is the integer 1 or 2.

Typical heterocyclic groups include, for example, carbazyl, acrydinyl, indolyl, imidazolyl, quinolyl, pyridyl and the like. Polynuclear aromatic groups such as naphthyl, anthryl, phenanthryl, pyrenyl, and the like may be mentioned as typical R-substituents.

The photoconductive substances of the present invention are novel compounds, which are obtained by polymerization of derivatives from glutamic acid. The following procedures are illustrative of methods by which typically useful compounds are prepared.

Synthesis of homopolymer (1) of the foregoing general formula wherein n is 2 and R is:

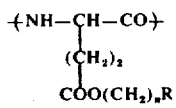

4.4g (0.03 mol) of L-glutamic acid, 6.7g (about 0.036 mol) of N-ethylol carbazole and 6.7g (about 0.035 mol) of p-toluene sulfonic acid are dissolved in 10 ml of dioxane and heated at 70°C for 7 hours while removing the by-product water from the reaction system by distillation. Upon completion of the reaction, the reaction product is dissolved in ethanol and sufficient triethyl amine is added to effect neutralization. The neutralized product is filtered, washed three times with warm water at a temperature of about 40°C, extracted with acetone and warm water, in order, and dried. (Product A)

1.5g (0.0044 mol) of product A is dispersed in 80 ml of dioxane, and phosgene is flowed into the resulting dispersion at 35°C for 1 hour. The thus treated dispersion is recrystallized four times from ethyl acetate-petroleum ether, followed by vacuum drying over $P_2O_5$. (Product B)

1.46g (about 0.004 mol) of product B is dissolved in 50 ml of dioxane and n-hexyl amine is added to the resulting solution at a ratio of 1/100 (molar ratio) relative to product B. The mixture is reacted by stirring at room temperature for 10 days. Upon completion of the reaction, the reaction mixture is recovered and recrystallized from methanol, to obtain the desired polymer. This polymer is soluble in organic solvents such as chloroform, dimethyl formamide, dimethyl sulfoxide, dioxane, tetrachloroethane, etc. A variety of derivatives of polyglutamic acid with molecular weights of from 1,000 – 100,000 represented by general formula (I) can be obtained by introducing various aromatic rings into the side chain in accordance with the foregoing synthesis. Typical compounds with calculated and observed analysis are as follows:

(1) 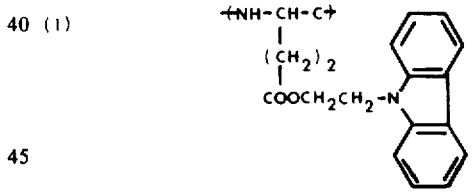

|  |  | C | H | N |
|---|---|---|---|---|
| analysis: | cal. | 70.88 | 5.59 | 8.70 |
|  | obs. | 69.63 | 5.93 | 8.14 |

(2) 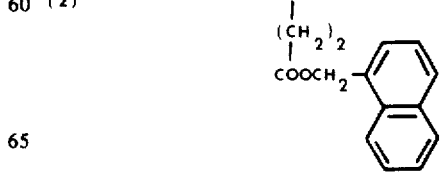

|          | C     | H    | N    |
|----------|-------|------|------|
| analysis: cal. | 71.37 | 5.58 | 5.20 |
| obs. | 69.74 | 6.02 | 5.20 |

(3) 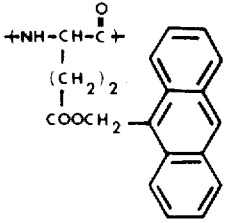

|          | C     | H    | N    |
|----------|-------|------|------|
| analysis: cal. | 75.22 | 5.37 | 4.39 |
| obs. | 73.52 | 5.05 | 3.79 |

(4) 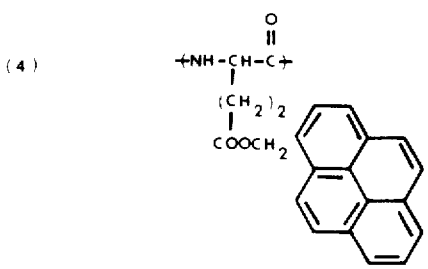

|          | C     | H    | N    |
|----------|-------|------|------|
| analysis: cal. | 76.95 | 4.99 | 4.08 |
| obs. | 75.16 | 4.59 | 4.39 |

It is also possible, following these general procedures, to introduce at least two kinds of aromatic groups into the side chain, to produce copolymers of derivatives of glutamic acid of general formula (I), wherein R represents at least two different groups. The following copolymer is representative of compounds of this class which are specifically included within the scope of the invention.

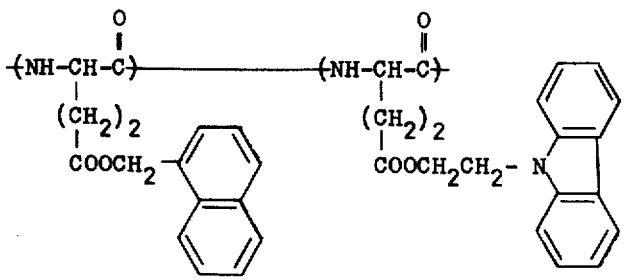

|          | C     | H    | N    |
|----------|-------|------|------|
| analysis: cal. | 71.05 | 5.62 | 7.10 |
| obs. | 70.01 | 5.83 | 6.08 |

The polyglutamic acid derivatives of this invention have superior transparency compared to other products similarly employed. Since their degree of polymerization is easy to control, such desirable properties as hardness, solubility, and others which are important for the intended use are readily controlled. The products are protein like in structure and have 3.7 primary units per helix structure. As a result, they manifest excellent crystallizability and a satisfactory state of piling of the aromatic rings in the side chain, so that the movement of carrier becomes easy. By virtue of the foregoing properties, their photoconductivity is enhanced, and this contributes to their excellent electrophotographic properties. They have good film-forming ability. Their adhesion to the support can be improved by mixing with a resinous binder, and it is preferred to do so.

Photoconductive layers comprising a mixture of at least one of the novel products of this invention together with a resinous binder on a suitable support have been observed to produce electrophotographic copying materials manifesting all of the excellent properties of such materials including a satisfactory adhesion of the photoconductive layer to the support.

Suitable resinous binders for use in this invention include, for example, acrylic resins such as polymethyl methacrylate, polybutyl methacrylate, etc., polyesters such as polycarbonates, polyethylene terephthalate, etc., and various thermoplastic resins such as polyethylene, polybutylene, polystyrene, vinyl chloride-vinyl acetate copolymer, polyvinyl cinnamate, and the like. Typically, the amount of a resinous binder employed will be from about 5 – 50% by weight, preferably 40 – 40% by weight, based on the total weight of the photoconductive layer. The resinous binders also improve the fixability of toners.

A plasticizer such as dimethyl phthalate, dioctyl phthalate, triphenyl phosphoric acid, etc. can be added to the materials used to form the photoconductive layer to improve its flexability. The amount of a plasticizer to be added will normally be from 20 – 30% by weight based on the total weight of the photoconductive substance.

The photosensitive range of the photoconductive layers of the present invention may be extended to the visible-ray absorption range, and the sensitivity may be improved by the addition of a sensitizer such as Rose Bengal, Methylene Blue, Rhodamine B, Methyl Violet, Ethyl Violet, Acid Violet, Victoria Pure Blue, Crystal Violet, Rhodamine B extra, Rhodamine 6G, Sulfo-Rhodamine B, Alizanin, etc. The amount added is from about 0.01 – 5% by weight, preferably 0.03 – 0.5% by weight, of the photoconductive substance.

Pro-sensitizers for the photoconductive layer may also be employed. These include, for example, polycyano derivatives such as tetracyano ethylene, tetracyano quinodimethane, organic acids such as phthalic acid, naphthalic acid, etc. and anhydrides thereof or nitro derivatives or anhydrides of these acids, such as 2, 7-dinitro naphthalic anhydride, quinones such as naphthoquinone, anthraquinone, etc. or derivatives thereof such as 2, 4, 7-trinitrofluorenone, 2, 4, 5, 7-tetranitrofluorenone, mononitroazafluorenones, aromatic halides such as trichlorobenzene, bromal, etc.

These pro-sensitizers are electron acceptors and remarkably accelerate the sensitization effect by forming an electric charge transferring complex with the polyglutamic acid derivative within the photoconductive layer. The appropriate amount of this electron acceptor to add to the photoconductive layer is from about 0.1 – 1.5 mol for each monomer unit of the photoconductive substance, and the optimum amount is 1.0 mol.

Any of the known conductive supports may be used to produce the products of this invention. These include metal plates such as zinc plates as well as more flexible supports such as cellulose products including ordinary paper and the like, or plastic films such as polyester and polyvinyl chloride films which have been treated for photoconductivity, or paper subjected to permeation-proof treatment.

An electrophotographic copying material according to the present invention may be prepared by dissolving the aforesaid photoconductive substance and resinous binder, if employed, in an appropriate solvent such as dimethyl formamide, dioxane, dimethyl sulfoxide, tetrachloroethane, chloroform, tetrahydrofuran, etc. or a mixture of such solvents; coating the resulting solution on the selected support base by any known method, e.g., blade-coating, roll-coating, barrel-coating, etc., while adjusting the thickness of the coating film according to the intended use; and drying thereafter.

The electrophotographic copying material thus prepared, when subjected to electrification by corona discharge, exposure to light, development, and fixation in the usual manner by any known method, can produce a copied image faithful to an original image.

DESCRIPTION OF THE PREFERRED EMBODIMENTS

EXAMPLE 1

30g of a derivative of polyglutamic acid with a molecular weight of about 12,000 (a homopolymer of general formula (I) wherein $n$ is 1 and R is naphthyl) and 4g of a polycarbonate with a molecular weight of about 30,000 (Panlite K 1300; Teijin) were dissolved in 300g of tetrachloroethane. Then, by mixing 2, 7-dinitro naphthalic anhydride with the resulting solution at a molar ratio of 1:1, a photosensitive layer formable liquid composition was prepared. This liquid was coated on an aluminum plate by barrel-coating method to form a photosensitive layer with a dry thickness of 5$\mu$, and prepare an electrophotographic copying material.

This copying material was charged with positive electricity by corona discharge in the dark and then subjected to projection exposure through an original for 10 seconds at an intensity of illumination of white light at 100 luxes. When the thus treated copying material was subjected to dry-development by sprinkling a powder developer comprising mainly carbon black, followed by heating and fixation, a black-colored image accurately reproducing the original was produced. The adhesive property of this image in relation to the photoconductive layer and the intensity of adhesion between the photoconductive layer and the support were both satisfactory.

EXAMPLE 2

30g of a derivative of polyglutamic acid having a molecular weight of about 6,000 (a homopolymer of the general formula (I) wherein $n$ is 1 and R is a carbazyl group) and 6g of cyclo-rubber were dissolved in 300g of chloroform. Then by mixing the resulting solution with 3-nitrofluorenone at a molar ratio of 1:1, a photosensitive layer formable liquid composition was prepared. This liquid was blade-coated onto a film subjected to inductive treatment to form a photoconductive layer having a dry thickness of about 8$\mu$ to prepare an electrophotographic copying material. This copying material was charged with positive electricity by corona discharge and exposed to light through an original film for 1.5 seconds at an intensity of illumination at 100 luxes. The thus treated copying material was developed by means of a wet developer to form an excellent image.

A similar electrophotographic copying material was prepared in the same way as above except for the addition of 0.6g of Rhodamine B extra as a sensitizer to the photosensitive layer forming liquid composition. the sensitivity of this copying material was improved and exposure could be effected by applying only 90 luxes for 1.5 seconds. Other characteristics of this copying material were identical with those of the foregoing example.

EXAMPLE 3

30g of a derivative of polyglutamic acid (a homopolymer having a molecular weight of 12,000 expressed by the general formula (I) wherein $n$ is 1 and R is anthryl group) was dissolved in 300g of tetrachloroethane to prepare a photosensitive layer forming liquid. This liquid was applied by barrel-coating to an aluminum plate such that the dry thickness of the resulting photosensitive layer was 10$\mu$. It was dried to prepare an electrophotographic copying material.

EXAMPLE 4

30g of a derivative of polyglutamic acid (a homopolymer having a molecular weight of 9,000 expressed by the general formula (I) wherein $n$ is 2 and R is pyrenyl group), 20g of 2, 4, 7-trinitrofluorenone and 5g of the same polycarbonate employed in Example 1 were dissolved in 500g of tetrachloroethane to prepare a photosensitive layer forming liquid. This liquid was applied by barrel-coating to an aluminum plate such that the dry thickness of the resulting photosensitive layer was 10$\mu$. It was dried to prepare an electrophotographic copying material.

EXAMPLE 5

30g of a derivative of polyglutamic acid (a copolymer of a monomer expressed by the general formula (I) wherein $n$ is 1 and R is naphthyl group and a monomer expressed by the general formula (I) wherein $n$ is 2 and R is carbozyl group, said copolymer having a molar ratio 1:1 and a molecular weight 7,000) and 4g of the same polycarbonate employed in Example 1 were dissolved in 300g of tetrachloroethane. To this solution was added a 1% methanol solution of Rose Bengal to produce a photosensitive layer forming liquid. This liquid was applied onto an aluminum plate such that the dry thickness of the resulting photosensitive layer was 5$\mu$. It was dried to prepare an electrophotographic copying material.

The exposure time required for formation of an image using a 100-lux white light source was 14 seconds in Example 3, 2 seconds in Example 4 and 2.5 seconds in Example 5 respectively.

What is claimed is:

1. An electrophotographic copying material comprising a conductive support and a photoconductive layer containing a photoconductor which is a derivative of polyglutamic acid having a molecular weight of from 1,000 to 100,000 and the formula:

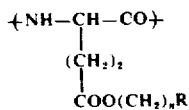

wherein
R represents polynuclear aromatic or heterocyclic nitrogen groups each containing up to about sixteen carbon atoms, and
n is the integer 1 or 2.

2. A copying material according to claim 1, wherein the photoconductive layer contains a resinous binder to the extent of from 5 to 50% by weight based on the weight of the photoconductive layer.

3. A copying material according to claim 2, wherein said resinous binder is selected from the group consisting of polyacrylates, polycarbonates, polyesters, polyethylenes, polybutylenes, polystyrenes, vinyl chloride-vinyl acetate copolymers and polyvinyl cinnamates.

4. A copying material according to claim 1, wherein R is selected from the group consisting of carbazyl, acrydinyl, indolyl, imidazolyl, quinolyl, pyridyl, naphthyl, anthryl, phenanthryl and pyrenyl groups.

5. A copying material according to claim 1, wherein said photoconductive layer further contains a plasticizer.

6. A copying material according to claim 5, wherein the amount of said plasticizer is from 20 to 30% by weight based on the weight of the photoconductor.

7. A copying material according to claim 1, wherein said photoconductive layer further contains a sensitizer.

8. A copying material according to claim 7, wherein the amount of said sensitizer is from 0.01 to 5% by weight based on the weight of the photoconductor.

9. A copying material according to claim 1, wherein said photoconductive layer further contains a pro-sensitizer.

10. A copying material according to claim 9, wherein the amount of said pro-sensitizer is from 0.1 to 1.5 mol per 1 monomer unit of the photoconductor.

* * * * *